(12) United States Patent
Glynn

(10) Patent No.: US 8,044,107 B2
(45) Date of Patent: Oct. 25, 2011

(54) METHOD OF PRODUCING AN EMBEDDED RECYCLED CONTAINER SHEET

(75) Inventor: Kenneth P. Glynn, Flemington, NJ (US)

(73) Assignee: Bgreen Innovations Inc, Matawan, NJ (US)

( * ) Notice: Subject to any disclaimer, the term of this patent is extended or adjusted under 35 U.S.C. 154(b) by 150 days.

(21) Appl. No.: 12/456,721

(22) Filed: Jun. 22, 2009

(65) Prior Publication Data

US 2010/0183832 A1 Jul. 22, 2010

Related U.S. Application Data

(63) Continuation-in-part of application No. 12/321,406, filed on Jan. 21, 2009.

(51) Int. Cl.
*C08J 11/04* (2006.01)

(52) U.S. Cl. ........... 521/48; 521/40; 521/40.5; 528/480; 528/502 R; 528/502 C; 528/502 F; 528/503; 402/79; 428/34.1; 428/34.6; 428/34.7; 428/35.7; 264/160; 264/239; 264/252; 264/460

(58) Field of Classification Search .............. 521/40, 521/40.5, 48; 528/480, 481, 502 R, 502 C, 528/502 F, 503; 428/174, 411.1, 34.1, 34.6, 428/34.7, 35.1, 35.5, 35.7; 402/73, 74, 75, 402/76, 77, 78, 79, 80 P, 500; 264/138, 152, 264/159, 160, 163, 239, 248, 252, 259, 265, 264/472, 474, 476, 479, 481, 486, 460, 462
See application file for complete search history.

(56) References Cited

U.S. PATENT DOCUMENTS

| | | | |
|---|---|---|---|
| 5,447,675 A * | 9/1995 | Kephart | 264/259 |
| 5,468,779 A | 11/1995 | Yamamoto et al. | |
| 5,879,797 A | 3/1999 | Kim | |
| 2008/0145580 A1 | 6/2008 | McAllister et al. | |
| 2008/0241455 A1 | 8/2008 | DiNello et al. | |

* cited by examiner

*Primary Examiner* — James J Seidleck
*Assistant Examiner* — Frances Tischler

(57) ABSTRACT

A method of producing an embedded recycled container sheet includes: (a) providing a plurality of empty recycled plastic containers; (b) flattening the plurality of empty recycled plastic containers to reduce their width by at least 80%; (c) providing a base substrate of plastic; (d) placing the plurality of flattened, empty recycled plastic containers on the base substrate; and, (e) applying a molten top layer of plastic on the plurality of flattened, empty recycled plastic containers and on the base substrate, and cooling the molten top layer, so as to embed the plurality of empty recycled plastic containers between the top layer and the base substrate. A method of producing product from the resulting sheet involves creating the product using a processing step selected from the group consisting of molding, casting, cutting, machining, and combinations of these.

4 Claims, 8 Drawing Sheets

METHOD OF PRODUCING AN EMBEDDED RECYCLED CONTAINER SHEET

REFERENCE TO RELATED APPLICATIONS

This patent application is a continuation-in-part of U.S. patent application Ser. No. 12/321,406 filed on Jan. 21, 2009, entitled "Method Of Producing Composite Recycled Bottle Sheet Products", having the same inventor as herein and having the same assignee as herein.

BACKGROUND OF INVENTION a. Field of Invention

The invention relates generally to a method of producing composite recycled bottle (also referred to as containers herein) sheets from recycled plastic containers embedded in plastics. The substrate plastics are clear to opaque on at least one side for displaying the recycled containers therethrough. The recycled plastic bottles are sterilized and prepared prior to the embedding process. They may be sliced. e.g., vertically, and are rendered flat by any available technique, such as partial melt, steam compression or other method. When heated, the heating is such that the bottles are slightly melted to deform and fused so that original characteristics of the bottles remain visible, if somewhat obscurely, such as color, design, labels, and shape. The prepared containers (In this context, "containers" means whole or cut, but still identifiable containers) are the placed in a molten or tacky substrate and are then top-coated with a top layer to create the finished product. The sheets may then used to create products that display the individual deformed bottles in a recognizable manner.

b. Description of Related Art

The following patents are representative of the field pertaining to the present invention:

U.S. Pat. No. 5,468,779 to Yamamoto et al. describes a plastic material with a paint film in coarse-crushed, and a film decomposition agent, e.g. a heterocyclic compound such as imidazolek, a triazine compound such as benoguanamine, a phenylendiamine compound such as N-phenyl-N-isopropyl-p-phenylene diamine, is added to the coarse-crushed material. The mixture is then heated and kneaded to dissolve the paint film and uniformly spread the particles of the paint film in the plastic material. The physical properties and surface quality of the plastic material are substantially the same as those of the original material.

U.S. Pat. No. 5,879,797 to Kim describes s novel matrix containing nephrite jade power as a main component. By using the matrix, a variety of goods in the field of medical goods, utensil goods, agricultural goods, industrial goods, fishery goods, traffic goods, transportation goods, equipment for sports, electronic instruments, precision instruments, pr the like ca be prepared. The goods made of the matrix can show excellent effects of treating pathological symptoms (headache, numb feeling, indigestion, insomnia, pr the like), removing impurities (such as heavy metals), improving the quality of water, promoting the growth of plants by virtue of the inherent properties of nephrite jade.

United States Patent Publication US 2008/0020221 A1 describes systems and methods of generating a recycled output. The recycled output may include a fabric produced by fusing reclaimed plastic bags. The reclaimed plastic bags are fused together using a material manufacturing system. The system is typically configured to heat the plastic bags to a temperature wherein the plastic bags fuse together but do not completely melt. Some embodiments include the addition of different types of plastic or non-plastic materials to the recycled output. Also disclosed are systems and methods of controlling temperature and patterns within the recycled output.

United States Patent Publication US 2008/0145580 A1 discloses a recycled insulation material which includes plastic and/or rubber shredded or chopped up into individual pieces having random or semi-random sizes or semi-random air-pockets in between many of the individual pieces. The shredded or chopped up plastic and/or rubber pieces in combination with the air-pockets are configured to operate as an insulation filler for a variety of different panes, forms, pipes, conduits or any other item that requires insulation.

United States Patent Publication US 2008/0241455 A1 relates to an encapsulated member made with open molds for forming the exterior surface of the encapsulated member, wherein the encapsulation is accomplished with at least an outer skin configuration of a plastic, metal, ceramic or other moldable material for encapsulating pre-forms, reinforcements, sheeted materials, metallic pre-forms and other core materials that can be protected from the outer elements and manufacturing considerations. FIG. 3c shows an encapsulating reinforced member located within an open mold having skins thereon, and being filled with formable material.

Notwithstanding the prior art, the present invention is neither taught nor rendered obvious thereby.

SUMMARY OF INVENTION

The present invention provides a method of producing an embedded recycled container sheet, which includes: (a) providing a plurality of empty recycled plastic containers; (b) flattening the plurality of empty recycled plastic containers to reduce their width by at least 80%; (c) providing a base substrate of plastic; (d) placing the plurality of flattened, empty recycled plastic containers on the base substrate; and, (e) applying a molten top layer of plastic on the plurality of flattened, empty recycled plastic containers and on the base substrate, and cooling the molten top layer, so as to embed the plurality of empty recycled plastic containers between the top layer and the base substrate.

In some preferred embodiments of the present invention method of producing an embedded recycled container sheet, step (b) includes flattening by compressing and heating the containers to partially melt the containers to create a compressed flat plurality of recycled containers that are visibly identifiable.

In some preferred embodiments of the present invention method of producing an embedded recycled container sheet, step (b) includes heating the plurality of recycled containers at a temperature of at least the lowest melting point of the containers and exposure time is sufficient to partially melt, deform and flatten the bottles.

In some preferred embodiments of the present invention method of producing an embedded recycled container sheet, step (b) includes compressing the plurality of recycled containers utilizing at least one compression roller to flatten.

In some preferred embodiments of the present invention method of producing an embedded recycled container sheet, step (b) includes cutting the plurality of recycled containers prior to flattening.

In some preferred embodiments of the present invention method of producing an embedded recycled container sheet, the base substrate is a recycled plastic base substrate selected from the group consisting of clear plastic, opaque plastic, colored plastic and combinations thereof.

In some preferred embodiments of the present invention method of producing an embedded recycled container sheet, the top layer is a recycled plastic selected from the group consisting of clear plastic, opaque plastic and combinations thereof.

In some preferred embodiments of the present invention method of producing an embedded recycled container sheet, the method extends to producing a product from the embedded recycled container sheet. This present invention method includes: (a) providing a plurality of empty recycled plastic containers; (b) flattening the plurality of empty recycled plastic containers to reduce their width by at least 80%; (c) providing a base substrate of plastic; (d) placing the plurality of flattened, empty recycled plastic containers on the base substrate; and, (e) applying a molten top layer of plastic on the plurality of flattened, empty recycled plastic containers and on the base substrate, and cooling the molten top layer, so as to embed the plurality of empty recycled plastic containers between the top layer and the base substrate to create the sheet; and, (f) creating a product from the sheet so as to retain the visible display of the plurality of flattened recycled containers.

In some preferred embodiments of the present invention method of producing an embedded recycled container sheet product set forth in paragraph [00017] above, the method may include any of the specific steps set forth in paragraphs [00011] to [00016] above. In many embodiments, the products may be formed from the sheets by the processing step selected from the group consisting of molding, casting, cutting, machining, and combinations thereof.

The present invention also includes any product produced by the present invention methods set forth above. In some preferred embodiments of the present invention method of producing an embedded recycled container sheet product, the product is selected from the group consisting of a container having a bottom and at least one sidewall selected from the group consisting of a waste basket, a tray, a planting pot, a dish and a bin.

In some preferred embodiments of the present invention method of producing an embedded recycled container sheet product, the product is a flat product selected from the group consisting of a chair mat, a desk top mat, a table protector, a window panel, and a shelf.

In some preferred embodiments of the present invention method of producing an embedded recycled container sheet product, the product includes at least one curved component.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE EMBODIMENTS

Figure 1:
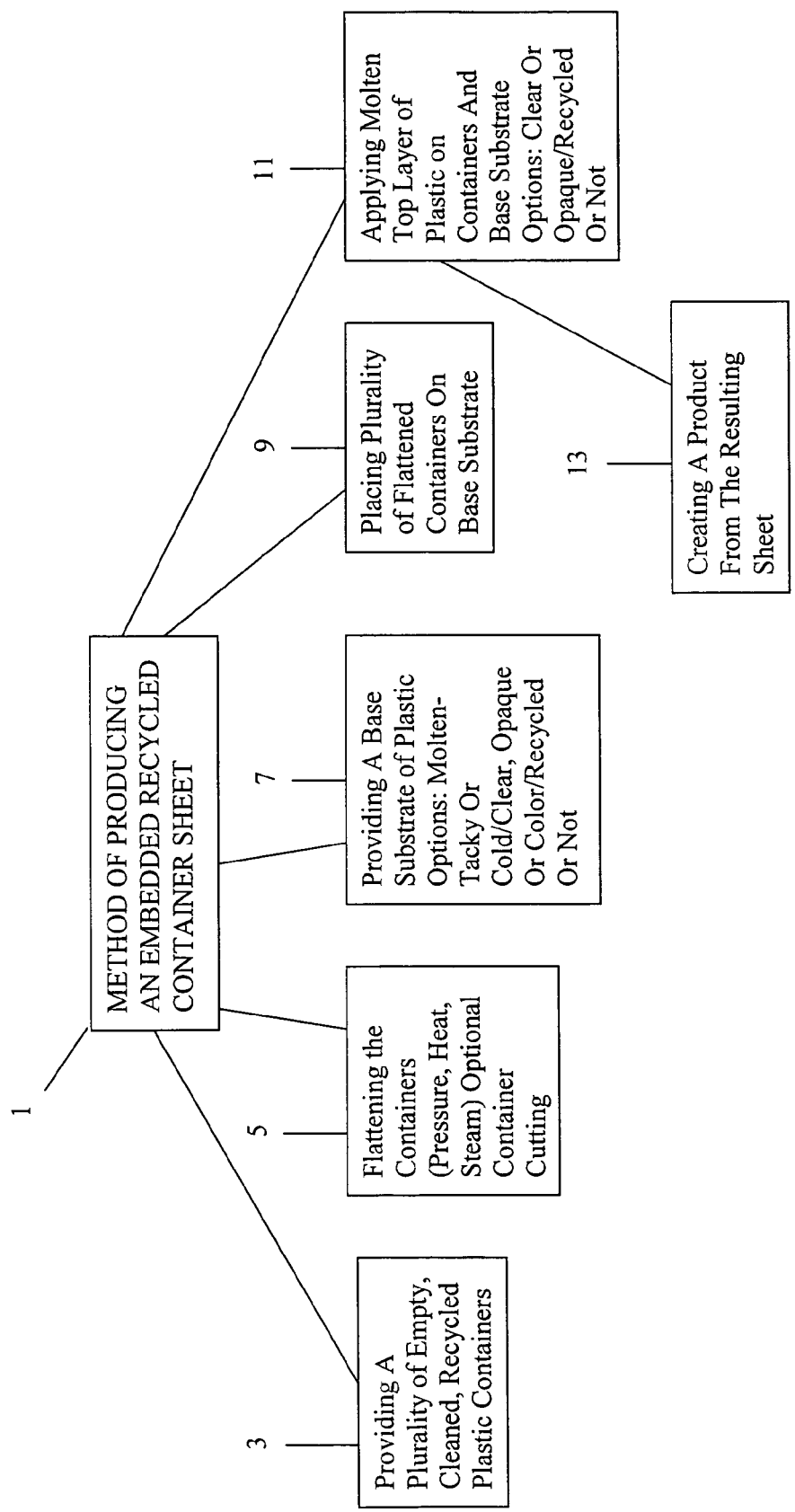
FIG. 1 is a schematic view of a method of producing an embedded recycled container sheet and product according to the present invention.

The present invention relates to a method of producing an embedded recycle sheet from recycled plastic containers. The recycled plastic containers are preferably sterilized and are flattened. Flattening may be accomplished by one or more of a number or options. These include optional precutting especially vertically cutting in half, followed by soft melting, compression, hot compression, steam deforming, steam compression such as steam calendaring.

Compression and heating of the containers may be accomplished by slightly melting to deform and flatten the containers. However, the original characteristics of the bottle remain visible, if somewhat obscurely, such as color, design, labels, and shape. The deforming may be such that one will recognize the original bottle. Thus, a Pepsi bottle will be distinguishable from a ginger ale bottle which will be distinguishable from a Coke bottle. PEPSI® is a registered trademark of PepsiCo, Inc., of Purchase, N.Y. COKE® is a registered trademark of The Coca-Cola Company, of Atlanta, Ga. The containers may be on different sizes, shapes, colors and materials (for example, polyethylene, polypropylene, blends or other container plastics). In some cases, labels may be removed from the bottles, but in other cases, they are not removed. Preferably paper labels are not kept. If labels are removed, they may be heat fused or melted. In some cases, the bottles may be chopped, in which case, the bottles may not be as easily identifiable.

In the present invention method, the plurality of empty recycled containers is flattened so that the width is reduced by at least 80% and preferably by at least 95%. These flattened recycled plastic containers are dropped onto a base substrate and then both the containers and the bas substrate are top-coated to embed the containers. Although not essential to the present invention, when the resulting sheets are designed to be flat, sufficient top coat is applied for a self-leveling flat surface. However, in some cases, it might be more attractive to have three dimensional topography rather than a smooth surface. For example, if the sheet is to be used at a head board, three dimensionality might be more artistically pleasing or exciting.

The base substrate may be any plastic that will stick to, adhere or otherwise bond to the top coat. The base substrate and the top coat or top layer may be the same or different and are preferably recycled plastic. Polyethylene, polypropylene, poly carbonates, and other plastics and blends may be used and the base substrate may be colored, opaque, transparent, or combinations of these. The top layer must be at least partially transparent or opaque to render the embedded containers visibly recognizable.

In continuous process systems, the base substrate is continuously extruded, the flattened containers are dropped or fed onto molten base substrate and the top layer is applied in molten or liquid state the continuous laminate with the cut embedded containers is cooled and for subsequent use. In other continuous processes, the base substrate could be cooled or partially cooled before the flattened containers are applied, and or the top layer could be a cooled sheet or pellets with subsequent heating or compression and heating. Likewise, batch processes may involve any of the preceding combinations but in fixed dimension molds instead of continuous flow units.

Referring now to the drawings, FIG. 1 is a schematic view of a method of producing an embedded recycled container sheet 1 and product from recycled plastic containers 1 according to the present invention.

The method of producing the embedded recycled sheet 1 includes: (a) providing a plurality of empty, preferably cleaned, recycled plastic container 3; (b) flattening and optionally precutting the containers 5; (c) providing a base substrate of plastic 7; (d) placing the plurality of flattened containers on the substrate 9; (e) applying a top layer of plastic over the containers and substrate 11 to form a sheet 11; and, (f) creating a product from the sheet so as to retain the visible display of the plurality of deformed identifiable containers 13.

Figure 2:
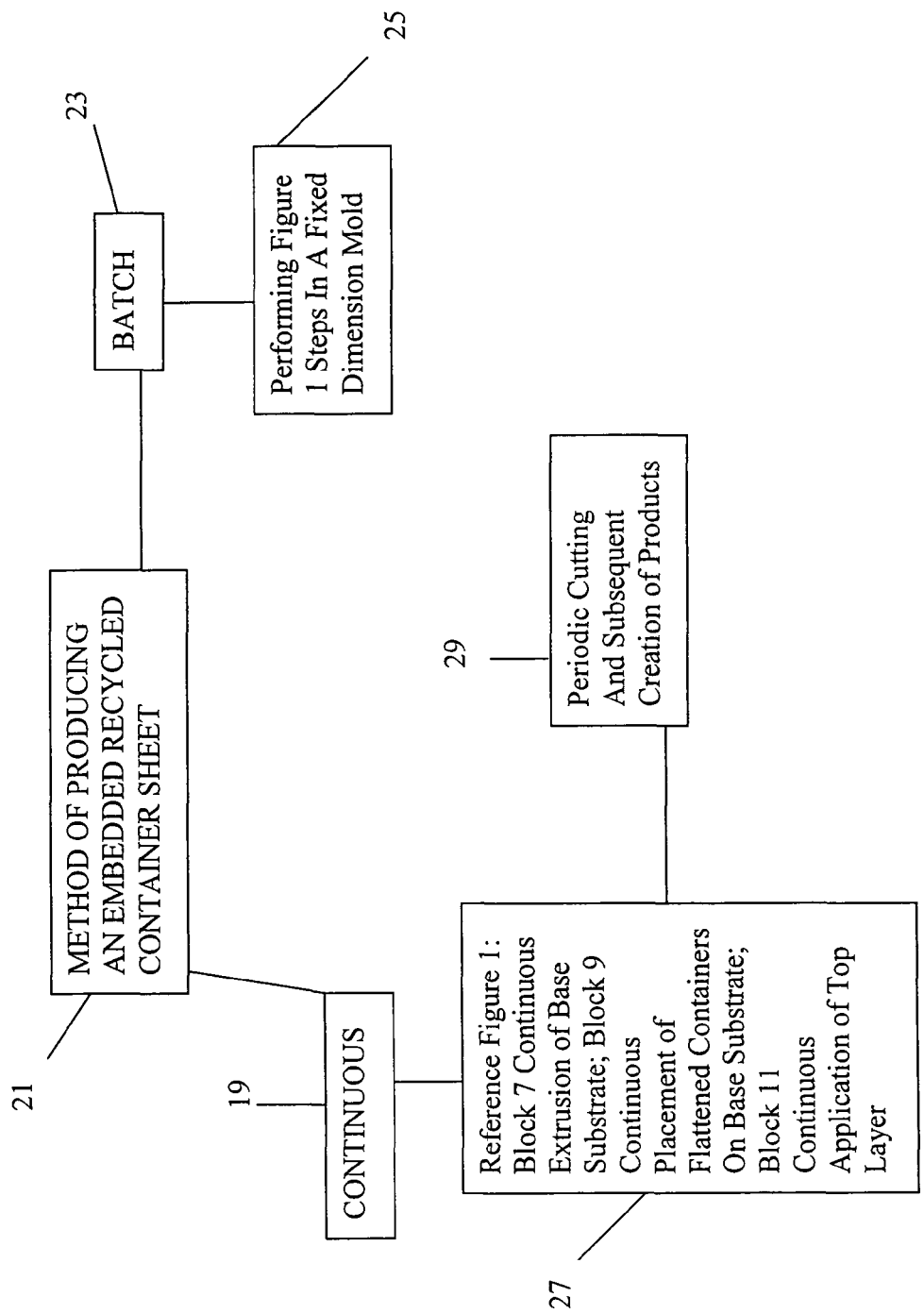
FIG. 2 is a schematic view of a method of producing an embedded recycled container sheet and product according to the present invention, illustrating a batch process and a continuous process.

FIG. 2 is a schematic view of a method of producing an embedded recycled container sheet product 21 from recycled plastic bottles according to the present invention, illustrating a continuous process 19 and a batch process 23.

With regard to the batch process 33, the compressed flat composite recycled bottle sheet is formed in a fixed dimension mold 25, which may have predetermined fixed length and width dimensions or may have a non-rectangular fixed shape.

With regard to the continuous process 19, frame 27 shows that the blocks of FIG. 1 (blocks 7, 9, and 11) may be continuous process steps. The resulting sheet may be periodically cut and used to create carious products 29.

Figure 3:
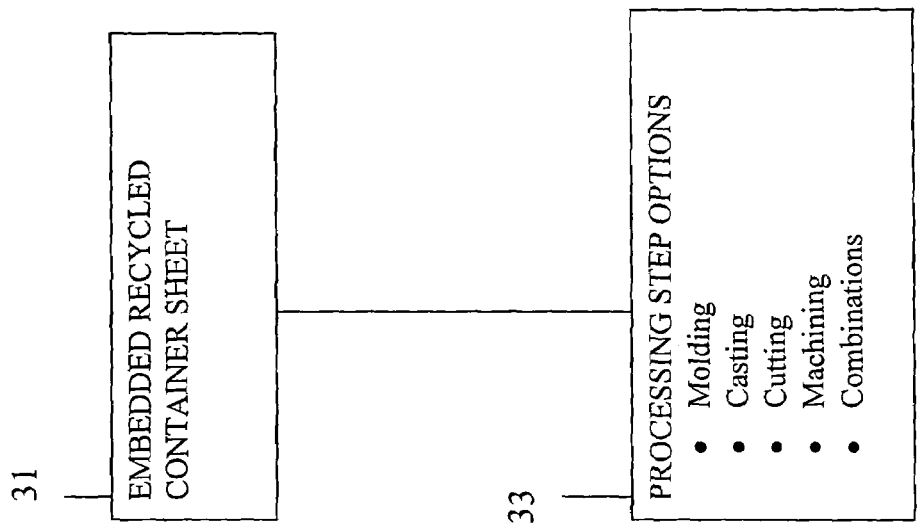
FIG. 3 is a schematic view of a method of producing an embedded recycled container sheet and product according to the present invention, illustrating processing steps for creating the product.

FIG. 3 is a schematic view of a method of producing an embedded recycled container sheet product 31 from recycled plastic containers according to the present invention.

With regard to box 33, creating the product from compressed flat composite recycled bottle sheets includes a processing step selected from molding, casting, cutting, machining and combinations thereof.

Figure 4:
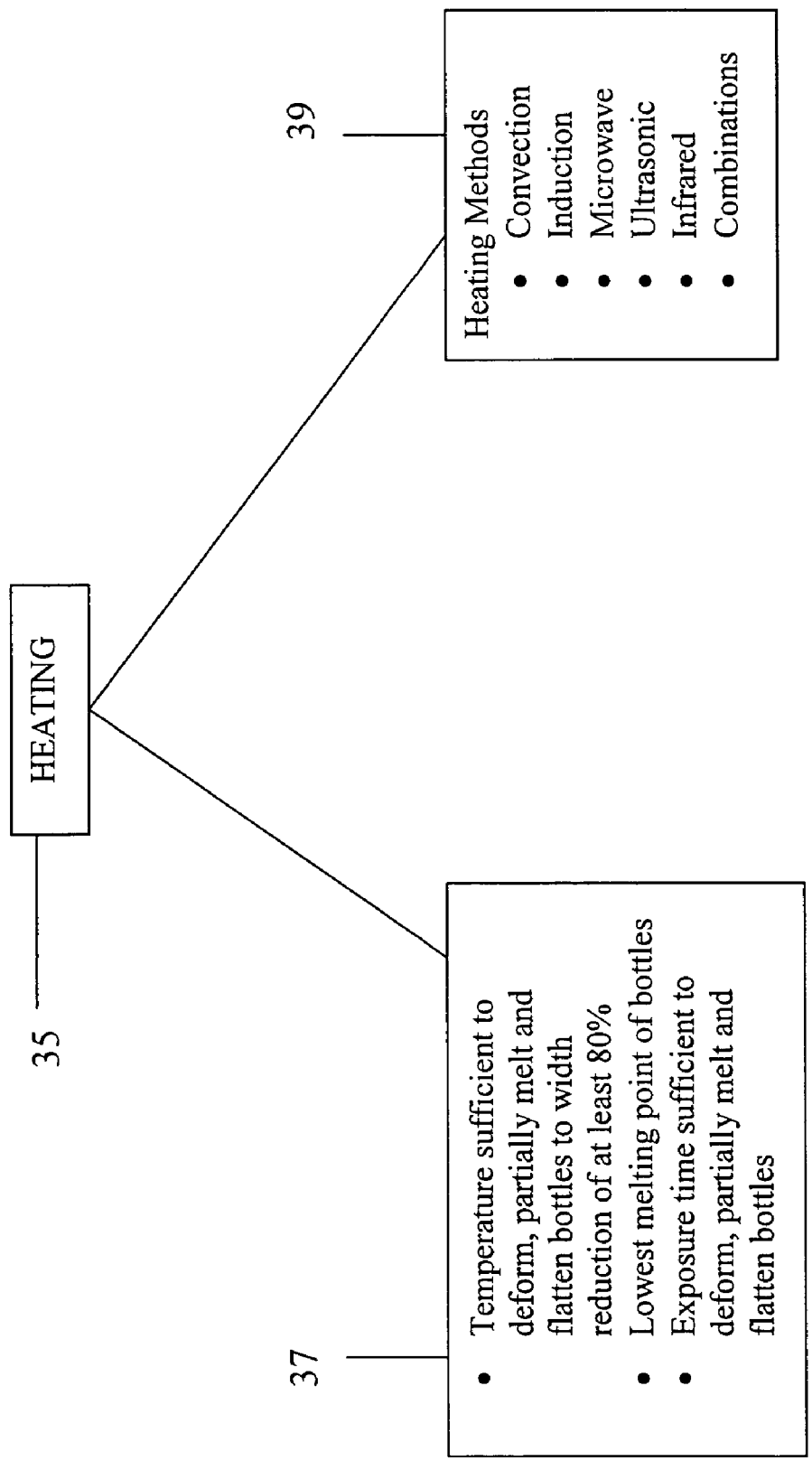
FIG. 4 is a schematic view of a method of producing an embedded recycled container sheet and product according to the present invention, illustrating heating.

FIG. 4 is a schematic view of a method of making an embedded recycled container sheet product from recycled plastic bottles according to the present invention, illustrating heating 35. With regard to the box 37, the heating is to a temperature sufficient to deform, partially melt and flatten the bottles, the heating is at a temperature of at least the lowest melting point of the bottles and exposure time is sufficient to deform, partially melt and flatten the bottles. With regard to box 39, the heating is performed utilizing a method selected from the group consisting of convection, induction, microwave, ultrasonic and infrared.

Figure 5:
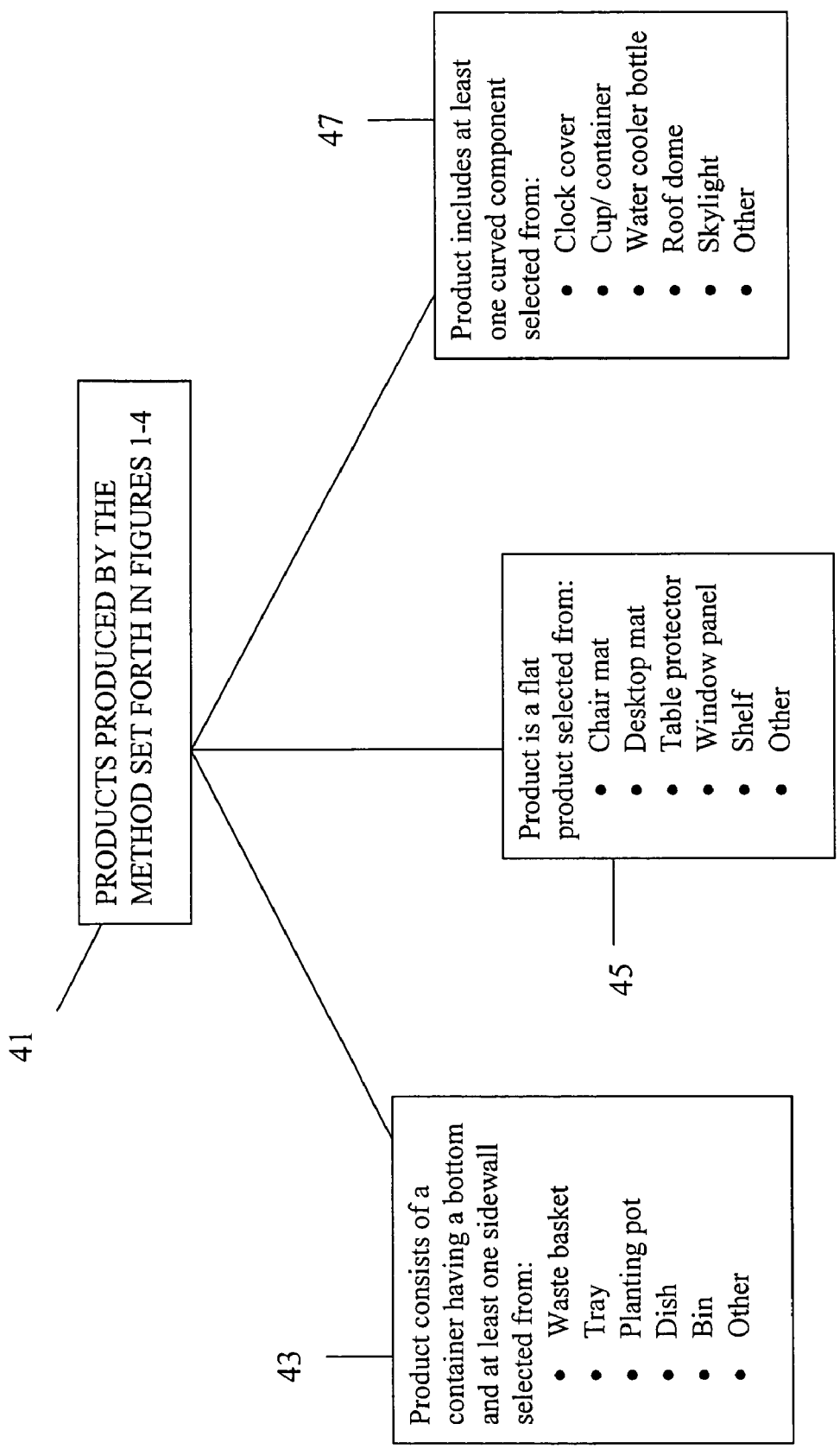
FIG. 5 is a schematic view of a method of producing an embedded recycled container sheet and product according to the present invention, illustrating products created.

FIG. 5 is a schematic view of a method of producing embedded recycled container sheet products from recycled plastic containers according to the present invention, illustrating products produced 4 1. With regard to box 43, the product consists of a container having a bottom and at least one sidewall, which includes a waste basket, a tray, a planting pot, a dish, a bin, and the like. These products may be circular, rectangular, square, polygonal, irregular or otherwise. With regard to box 45, the product is a flat product, which includes a chair mat, a desk top mat, a table protector, a window panel, a shelf, and the like. With regard to box 47, the product includes at least one curved component, which includes a clock cover, a cup, a water cooler bottle, a roof dome, a skylight, and the like.

Figure 6:
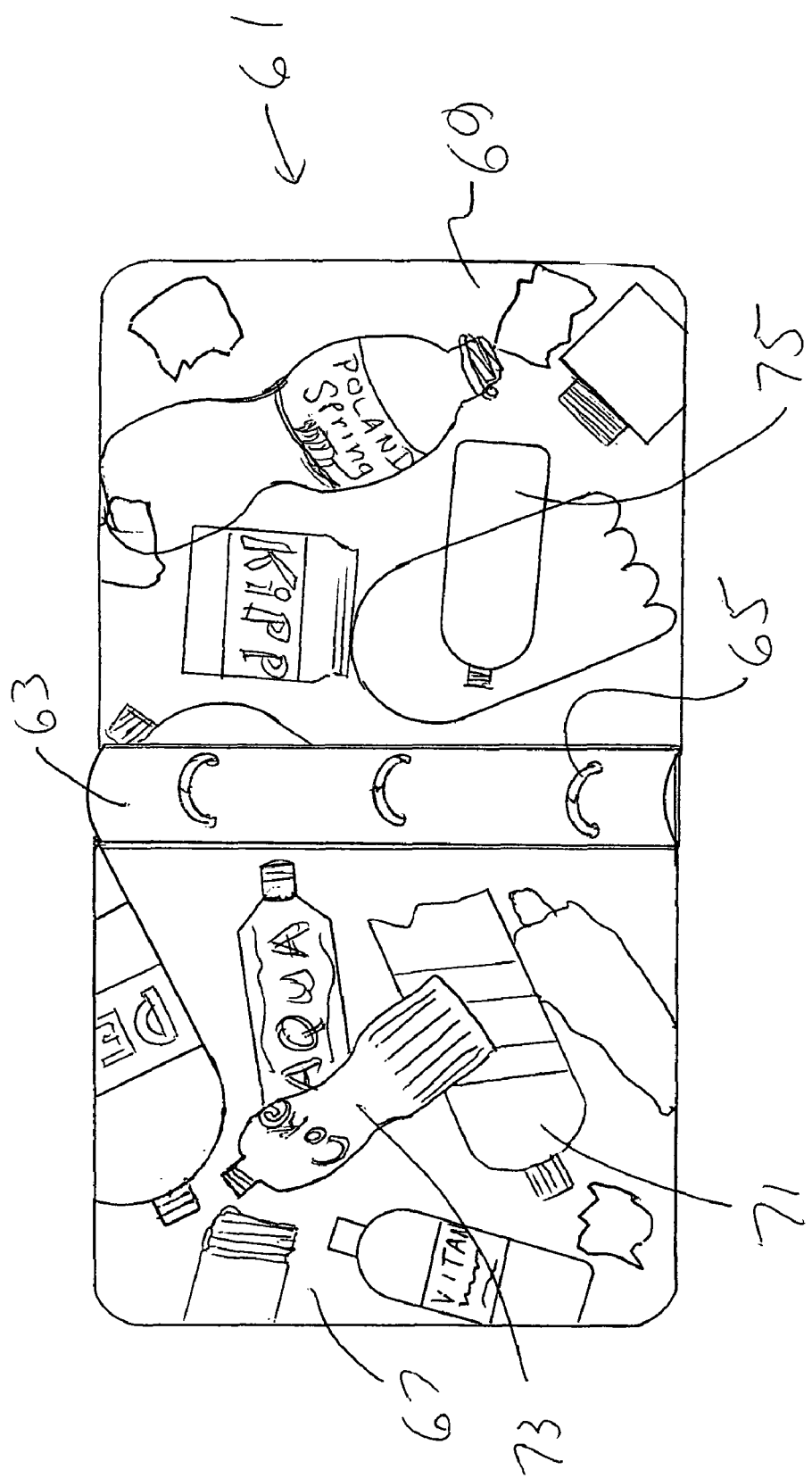
FIG. 6 shows a top view of an open binder created with sheet made by the method of the present invention.

FIG. 6 illustrates one product produced by the present invention methods, namely, binder 61. The binder 61 has front and back covers 67 and 69, respectively, that are made from the present invention embedded container sheets. The covers 67 and 69 are connected by spine 63 with rings such as ring 65. The covers 67 and 69 are clear recycled plastic sheets formed by present invention methods with embedded flattened recycled plastic containers, such as labeled containers 71 and 73 and unlabeled container 75.

Figure 7:
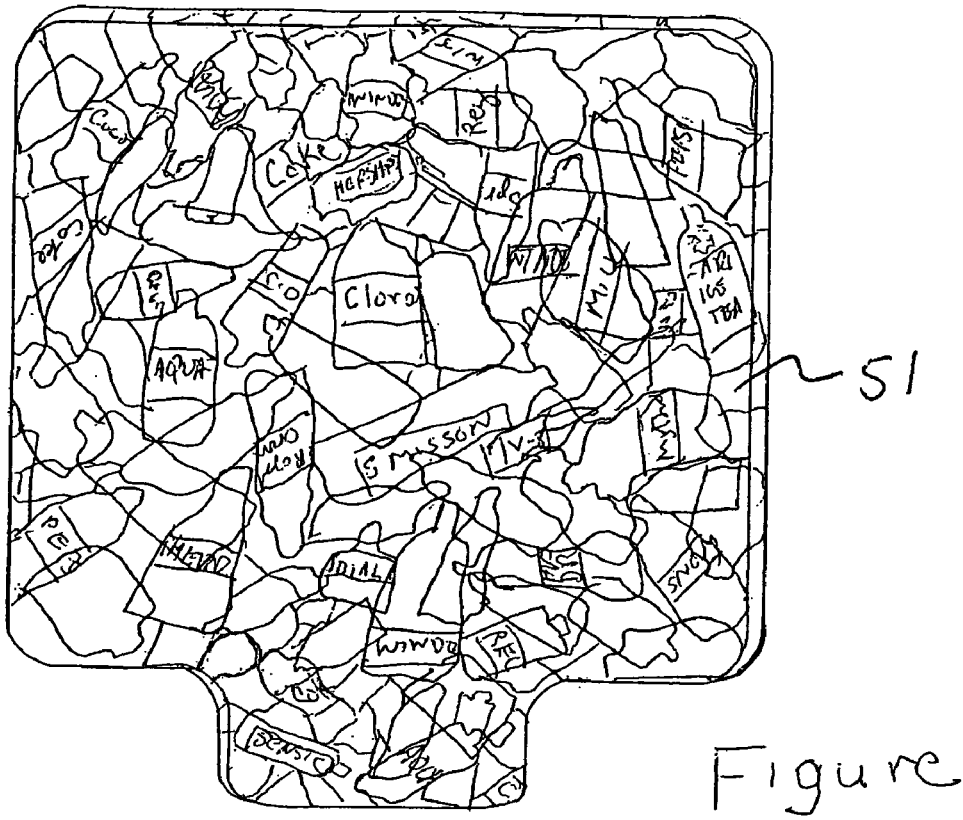
FIG. 7 illustrates a top oblique view of a chair mat made by the method of the present invention.

FIG. 7 illustrates a top oblique view of a chair mat 51 made by the method of the present invention wherein a sheet according to the present invention method is cut or machined into the chair mat 51 for placement under chairs.

Figure 8:
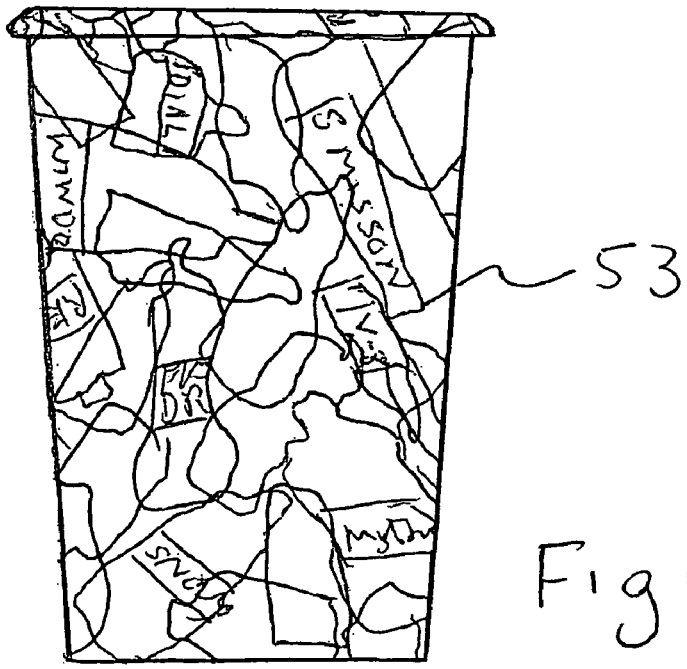
FIG. 8 illustrates a side view of a waste basket made by the method of the present invention.

FIG. 8 illustrates a side view of a waste basket 53 made by the method of the present invention wherein a sheet according to the present invention method is compression molded into the waste basket 53.

Figure 9:
FIG. 9 illustrates a side oblique view of a plant pot made by the method of the present invention; and, FIG. 10 illustrates a front view of a water cooler with a bottle made by the method of the present invention.

FIG. 9 illustrates a side oblique view of a plant pot 55 made by the method of the present invention wherein a sheet according to the present invention method is molded into the pot 55.

Figure 10:
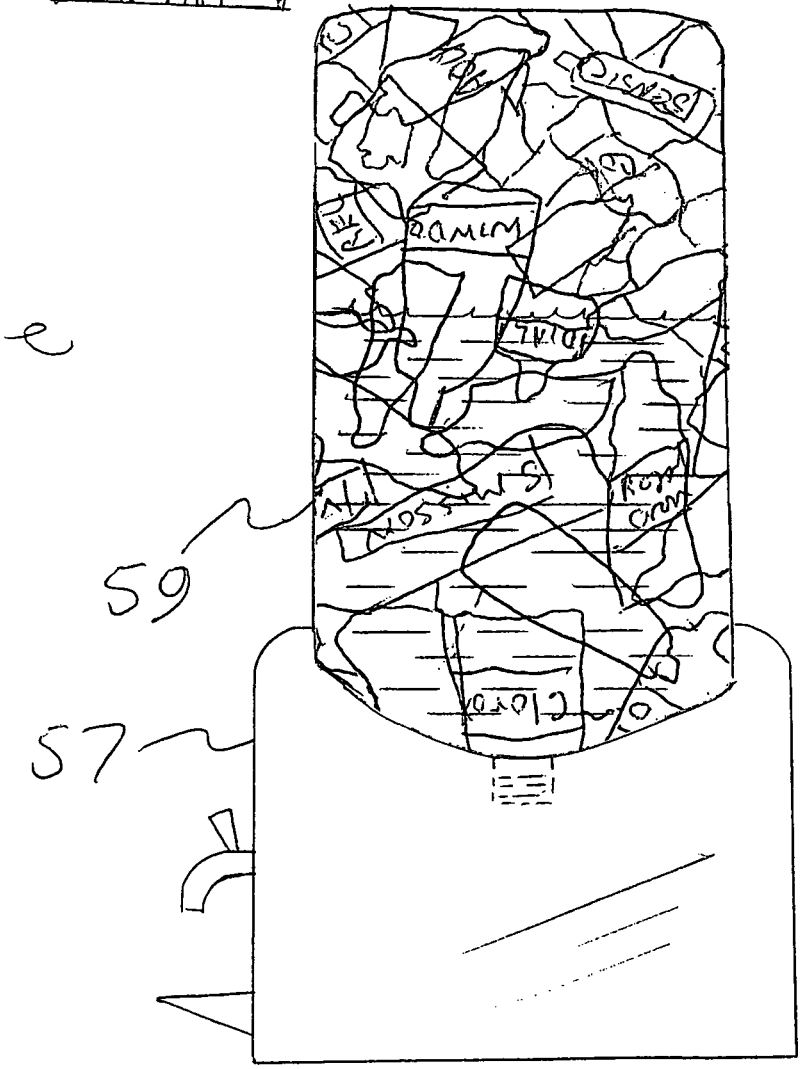

FIG. 10 illustrates a front view of a water cooler 57 with a bottle 59 made by the method of the present invention wherein a sheet according to the present invention method is blow molded as a single piece or is compression molded in two parts and heat welded into the present invention bottle 59.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A product produced by the method of producing an embedded recycled plastic container sheet product which comprises:
   (a) providing a plurality of empty recycled plastic containers;
   (b) flattening said plurality of empty recycled plastic containers to reduce their width by at least 80%;
   (c) providing a base substrate of plastic;
   (d) placing said plurality of flattened, empty recycled plastic containers on said base substrate;
   (e) applying a molten top layer of plastic on said plurality of flattened, empty recycled plastic containers and on said base substrate, and cooling said molten top layer, so as to embed said plurality of empty recycled plastic containers between said top layer and said base substrate to create said sheet; and,
   (f) creating a product from said sheet so as to retain a visible display of said plurality of flattened, recycled containers.

2. The product produced by the method of producing an embedded recycled plastic container sheet product of claim 1 wherein said product is selected from the group consisting of a container having a bottom and at least one sidewall selected from the group consisting of a waste basket, a tray, a planting pot, a dish, and a bin.

3. A product produced by the method of producing an embedded recycled plastic container sheet product of claim 1 wherein said product is a flat product selected from the group consisting of a chair mat, a desk top mat, a table protector, a window panel, and a shelf.

4. A product produced by the method of producing an embedded recycled plastic container sheet product of claim 1 wherein said product includes at least one curved component.

* * * * *